Sept. 4, 1956
E. F. HUDDLE
2,761,299
TELESCOPING GUIDED SHAFT CLUTCH ARRANGEMENT
Filed Aug. 25, 1954
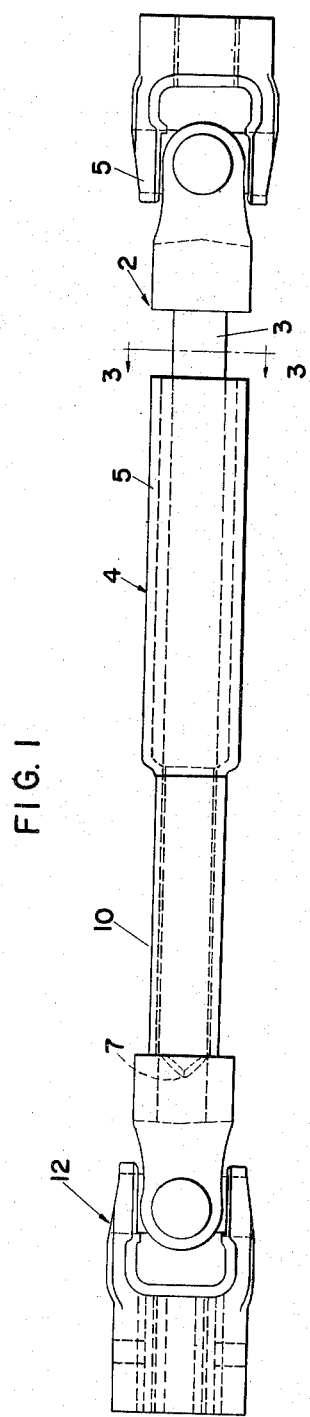
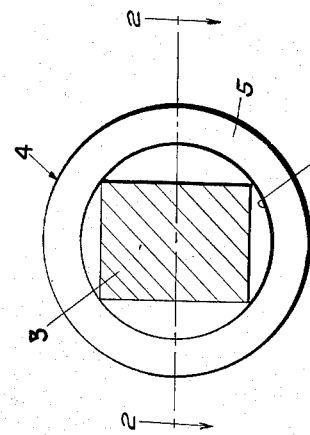
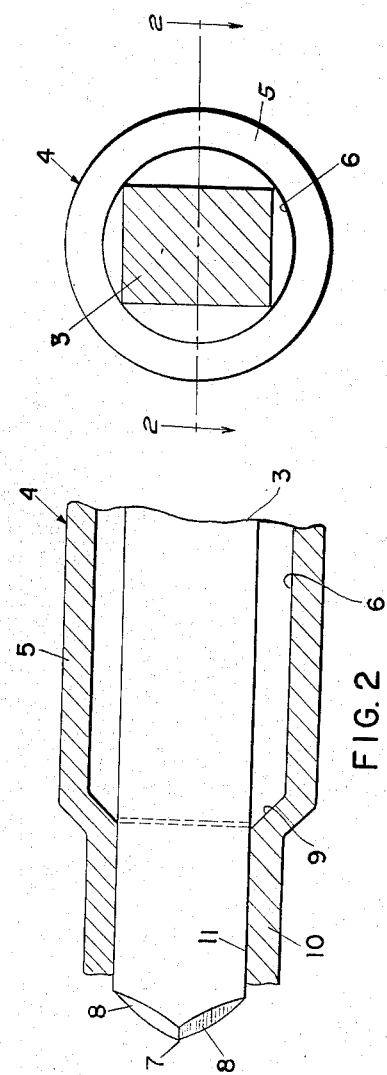
INVENTOR.
EDWIN F. HUDDLE
BY Paul O. Pippel
ATTY.

United States Patent Office 2,761,299
Patented Sept. 4, 1956

2,761,299

TELESCOPING GUIDED SHAFT CLUTCH ARRANGEMENT

Edwin F. Huddle, Elmwood Park, Ill., assignor to International Harvester Company, a corporation of New Jersey Application August 25, 1954, Serial No. 452,110

3 Claims. (Cl. 64—23)

This invention relates to a power transmission and more specifically to a novel telescoping shaft clutch assembly.

A general object of the invention is to provide a novel and simple power transmission of the telescoping shaft type wherein the transmission of power may be interrupted by extending the shafts and reestablished by telescoping the shafts and means being provided to maintain the shafts in guided engagement with each other in the extended position and drivingly connected in the telescoped position.

A more specific object of the invention is to provide such a transmission incorporating an outer tubular shaft which has an inner end cylindrical portion which is adapted to pilot the inner shaft in the extended position of the shafts and the outer shaft having a rectangular socket portion which communicates with the cylindrical portion and which is adapted to receive the complementary section of the inner shaft in the telescoped position of the shafts for clutching engagement therewith.

These and other objects of the invention will become more apparent from the specification and drawings, wherein:

Figure 1 is a side view of the telescoping shafts;

Figure 2 is an enlarged longitudinal sectional view taken substantially on the line 2—2 of Figure 3; and Figure 3 is a further cross-sectional view on an enlarged scale with respect to Figure 1 taken substantially on the line 3—3 of Figure 1.

Describing the invention in detail, the transmission assembly generally designated 2 comprises an inner shaft 3 and an outer shaft 4, either of which may be the driven or driving shafts. The inner shaft 3 is connected at its outer end to a drive transmitting means in the form of a universal joint 5 and the shaft 3 is of polygonal cross-section, preferably rectangular, as best seen in Figure 3. The shaft 3 is telescoped within the shaft 4 and the outer shaft 4 comprises an inner end pilot or guide portion 5 which is of cylindrical form and provides an inner cylindrical guide surface 6 which is of a diameter substantially equal to that of the diagonal distance or cross dimension of the shaft 3 as best seen in Figure 3. The shaft 3 has an inner end with a nose 7, the corners of which are rounded as at 8. The pointed nose is adapted for guiding engagement with the guide surface 9 which is of frusto-conical or truncated conical form which provides a guide for the pointed nose 7 of the shaft 3 into the rectangular socket portion 10 formed in the outer end of the shaft 4 and said socket portion 10 having the non-round or polygonal socket cavity 11 which receives the shaft 3 therein in the telescoped position of the shafts as shown in Figure 1. It will be readily appreciated that upon the shafts being extended the inner end of shaft 3 is piloted within the cylindrical portion 5 of the inner end outer shaft and rotates therein without drive being transmitted between the shafts 3 and 4. In order to accomplish a drive connection the shafts are telescoped until the shaft 3 is socketed within the portion 10 whereupon drive is established.

It will be noted that the outer end of the outer shaft is provided with a power transmitting means in the form of the universal joint 12 and that the provision of the rectangular arrangement between the shaft 3 and the socket 10 accomplishes the purpose of interrelating these knuckles in a preset relationship because the two shafts can only connect in either of two positions separated 180° apart.

It will be understood that the design herein shown and described is merely by way of illustration and not limitation and that the scope of the invention is to be gauged by the nature of the appended claims.

I claim:

1. In an interruptable drive transmitting arrangement, telescoping driving and driven members, one of said members comprising first and second integrally connected tubular portions disposed in end to end relation, said first portion having an internal cylindrical surface and said second portion having an internal polygonal surface, said first portion tapered to said second portion in the region of connection thereto and providing an internal guide surface substantially in the form of a truncated cone between said surfaces and merging therewith, the other of said members comprising a drive transmitting portion of polygonal cross-section complemental to that of said first portion and in extended position of said members disposed in said first portion and rotatable in said cylindrical surface, said other member having a pointed end adjacent to said second portion in said extended position of said members for guided engagement with said truncated conical surface upon telescoping of said members to guide said portion on said other member into said second portion of said first member to establish a driving connection between said members and said first portion disposed at the end of said one member adjacent to said other member.

2. A discontinuous driving transmission, a driving and a driven shaft, one of said shafts being hollow and telescoping the other shaft therewithin, said one shaft having an inner end guide portion of cylindrical cross-section and the other shaft having an inner end non-round portion piloted in said guide portion in the extended position of said shafts whereby the driving shaft is rotatable relative to the driven shaft, said one shaft having an outer portion extending from said inner portion and having an internal socket of complementary cross-section to said non-round portion for receiving the same from said guide portion upon telescoping of said shafts to establish a driving connection between said shafts, and said other shaft is provided with a pointed nose and said one shaft having a tapered pilot surface extending from said cylindrical portion to said socket for guiding said one shaft into the latter attendant to said nose engaging said pilot surface.

3. The invention according to claim 2 and further characterized in that the major cross-dimension of said socket and of said cylindrical portion and of said other shaft being substantially equal.

References Cited in the file of this patent

UNITED STATES PATENTS

| | | |
|---|---|---|
| 1,896,901 | Knapp et al. | Feb. 7, 1933 |
| 2,072,728 | Cederstrom | Mar. 2, 1937 |